(12) United States Patent
Arndt et al.

(10) Patent No.: US 7,648,555 B2
(45) Date of Patent: Jan. 19, 2010

(54) METHOD OF CARRYING OUT A REACTION IN A MICROREACTION CHAMBER

(75) Inventors: Frank Arndt, Berlin (DE); Jens Dahl Jensen, Berlin (DE); Ursus Krüger, Berlin (DE); Hendrik Rönsch, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/992,713

(22) PCT Filed: Sep. 27, 2006

(86) PCT No.: PCT/EP2006/066797

§ 371 (c)(1),
(2), (4) Date: Mar. 27, 2008

(87) PCT Pub. No.: WO2007/036539

PCT Pub. Date: Apr. 5, 2007

(65) Prior Publication Data

US 2009/0117027 A1    May 7, 2009

(30) Foreign Application Priority Data

Sep. 28, 2005   (DE) .................. 10 2005 047 758

(51) Int. Cl.
    *B22F 9/16*   (2006.01)
(52) U.S. Cl. .................... 75/348; 75/351; 252/500; 977/777
(58) Field of Classification Search ............. 252/500; 977/777; 75/348, 351
    See application file for complete search history.

(56) References Cited

U.S. PATENT DOCUMENTS 6,913,934 B2 * 7/2005 Dales et al. ............. 436/180

2005/0016851 A1 * 1/2005 Jensen et al. ............ 204/471
2006/0053971 A1   3/2006 Sun et al.

FOREIGN PATENT DOCUMENTS

| DE | 10314380 A1 | 10/2004 |
|---|---|---|
| EP | 1165224 B1 | 1/2002 |
| GB | 2063695 A | 6/1981 |
| JP | 2004033901 | 2/2004 |
| JP | 2004033901 A | 2/2004 |
| WO | WO 9641864 | 12/1996 |
| WO | WO 0061275 A2 | 10/2000 |
| WO | WO 2005020659 A2 | 3/2005 |
| WO | WO 2005079964 A1 | 9/2005 |

OTHER PUBLICATIONS

Zhan GD, Kuntz JD, Wan J, Mukherjee AK, "Single-wall carbon nanotubes as attractive toughening agents in aluminabased nanocomposites", Comment in Nat Mater. Jan. 2003;2(1):15-6; http://www.ncbi.nlm.nih.gov/entrez/query.fcgi?db=pubmed &cmd=Retrieve&dopt=A..,Retrieved Jul. 17, 2006; pp. 1.
Firmenbrospekt von Capsulution NanoScience AG, "LBL-Technology(R)—A key to innovative products", 2003, Berlin, Germany, pp. 1-4.

* cited by examiner

*Primary Examiner*—Stuart Hendrickson
*Assistant Examiner*—Michelle Hou

(57) ABSTRACT

Disclosed is a method for carrying out a reaction in a microreaction chamber. Nanoparticles which have been advantageously subjected to specific reactions in the microreaction chamber are used for carrying out the reaction. The obtained reaction product, which is preferably also provided in the form of nanoparticles. can then be removed from the microreaction chamber. Advantageously, the ongoing reaction can be specifically influenced by using the microreaction chamber. Both endothermic and exothermic reactions can be carried out with an accurately predictable result by feeding energy in a dosed manner into/out of the reaction chamber.

8 Claims, 2 Drawing Sheets

METHOD OF CARRYING OUT A REACTION IN A MICROREACTION CHAMBER

CROSS REFERENCE TO RELATED APPLICATIONS

This application is the U.S. National Stage of International Application No. PCT/EP2006/066797, filed Sep. 27, 2006 and claims the benefit thereof. The International Application claims the benefits of German application No. 10 2005 047 758.5 filed Sep. 28, 2005, both of the applications are incorporated by reference herein in their entirety.

FIELD OF INVENTION

The invention relates to a method of carrying out a reaction in a microreaction chamber.

BACKGROUND OF THE INVENTION

Such methods are already known for example in accordance with WO 96/41864. They are used to force the so-called polymerase chain reaction (PCR) in DNA molecules. For this purpose, a solution containing DNA molecules is fed to the microreaction chamber, it being possible to irradiate the sample (for example with UV light) through a suitable window by means of a radiation source.

SUMMARY OF INVENTION

The object of the invention is to make a method of carrying out a reaction in microreaction chambers accessible to new applications.

This object is achieved according to the invention by a method of carrying out a reaction with a microreaction chamber, whereby nanoparticles of a first composition are introduced in a dosed manner through a first feed channel into the microreaction chamber and nanoparticles of at least one further composition are introduced in a dosed manner through at least one further feed channel into the microreaction chamber, wherein the nanoparticles of differing composition react with one another and a reaction product thus produced is removed from the microreaction cell. In this case, the dosed introduction may be effected for example by means of a carrier medium for the nanoparticles that is liquid or gaseous. This carrier medium may also be involved in the reaction (for example, oxygen of the carrier gas in an oxidation of the surface of nanoparticles). It is however also possible for the reaction in the microreaction chamber to occur in vacuo so that the nanoparticles are introduced as such into the reaction chamber.

In the case of the reaction of the nanoparticles of differing composition the reaction product may have a new composition. However, as a reaction the effect may also be achieved that the nanoparticles of differing composition attach to one another and the compositions of the individual nanoparticles are retained in the reaction product.

The reaction product itself is preferably likewise in the form of nanoparticles. It is however also conceivable for an agglomeration of the nanoparticles to produce larger structures that may for example have the dimensions of microparticles.

As nanoparticles in the sense of the invention are meant particles having a diameter in the nanometer range, i.e. particles having dimensions smaller than one micrometer. In this case, the nanoparticles have a matrix of a specific desired composition and may additionally have a multilayered structure. As microparticles in the sense of the invention are meant particles having dimensions in the micrometer range.

The use according to the invention of microreaction chambers to carry out reactions between nanoparticles has the advantage that the process management may be controlled very precisely. For example, very precise dosing of the nanoparticles is possible, so that in the case of agglomeration for example a desired alloy composition may be precisely adjusted. At the same time, by adding very low quantities of nanoparticles it is possible to prevent the nanoparticles, which because of their large surface in relation to the volume have a high surface energy, from entering into unwanted reactions, for example with other nanoparticles, after the dosing. Thus, the reaction wanted in each case may be realized with high efficiency in the microreaction chamber.

According to a development of the method it is provided that at least the nanoparticles of the first composition are functionalized at the surface before they are introduced into the reaction chamber. By functionalizing in the sense of the invention is meant in the broadest sense any conceivable type of treatment of the nanoparticles that influences their reaction behavior in a desired way. This may comprise for example an encapsulation of the nanoparticles by a capsule material. It is moreover possible to modify the surface of the nanoparticles, for example by doping thereof with specific alloying constituents. A method of functionalizing nanoparticles is provided also by the so-called LBL Technology® (LBL stands for layer by layer). This method was developed by Capsulution NanoScience AG, Berlin (www.capsulution.com) and published in a company brochure in 2003. By suitably charging the nanoparticles, on the one hand, and the substances to be coated, on the other hand, the latter may be precipitated from a suspension on the nanoparticles, thereby producing very thin encapsulations of the nanoparticles.

The functionalizing may advantageously be formed for example by a layer on the nanoparticles.

The method may be further improved if energy is supplied to or removed from the microreaction chamber in a controlled manner during the reaction of the nanoparticles. In this way, a purposeful management of the reaction in the microreaction chamber is possible. By supplying energy it is possible to bring about for example an endothermic reaction, the very small size of the nanoparticles meaning that the activation energies do not have to be very high. The energy may be supplied for example by means of a heating device or alternatively in the form of radiation (laser beam, UV light). A removal of energy may be effected for example by means of a cooling device (Peltier elements). A removal of energy is meaningful for example in the case of an exothermic reaction, the course of which is to be slowed down.

It is particularly advantageous if, as already mentioned, the reaction product likewise comprises nanoparticles. In this way, nanoparticles having specific requirement profiles may be formed from intermediate products that are likewise in the form of nanoparticles. Conceivable applications are for example the alloying of nanoparticles from elementary nanoparticles, with the alloy composition being precisely determinable. It is also possible to "fuse" nanoparticles of a simpler alloy into more complicated alloys. Another possible application is such that the nanoparticles provided as a reaction product are composed in each case of a small quantity of nanoparticles of the first and second composition (and possibly further compositions). In this case, it is possible to talk about "designer" nanoparticles that may be adapted to any desired applications with specific requirement profiles.

It is moreover advantageous if the dosing of the nanoparticles is assisted by means of a magnetic field that is superposed on the relevant feed channel, the nanoparticles being magnetized prior to the dosing. It is equally conceivable for the dosing of the nanoparticles to be assisted by means of an electric field that is superposed on the relevant feed channel, the nanoparticles being electrically charged prior to the dosing. By means of these measures the transporting of the nanoparticles from a suitable storage facility into the microreaction chamber is assisted because magnetized nanoparticles are able to move in the magnetic field and electrically charged nanoparticles are able to move in the electric field. By adjusting for example the field strength of the corresponding field the dosing may therefore advantageously be precisely adjusted. For this purpose, by means of tests using a correspondingly equipped arrangement with microreaction chamber it is to be determined which field strengths are necessary for the dosing that is to be achieved in each case. The mode of operation of the said transport system is described in detail in the German patent application bearing the file reference 10 2004 030 532.4.

An identical-type electrical charging of the nanoparticles moreover has the advantage that the nanoparticles are mutually repelled, thus avoiding a tendency of the nanoparticles to agglomerate owing to their high surface energy.

It is moreover advantageous if the nanoparticles are continuously fed and the reaction products are continuously removed. In this case, the dosing of the nanoparticles is to be effected in such a way that in the continuously occurring reaction in the microreaction chamber all of the reaction partners are always present in a suitable ratio. By bringing about a continuous reaction process in the reaction chamber an improvement of the quality of the reaction products is advantageously achieved as the reaction process may "fall in" with stationary reaction parameters.

It is moreover advantageous if there is added to the microreaction chamber a fluid reaction component that is involved in the reaction of the nanoparticles. In this case, for example an oxidation of the surface of metal nanoparticles might be achieved by adding oxygen as a reactive gas to the microreaction chamber. This advantageously provides an additional way of influencing the reaction in the microreaction chamber.

BRIEF DESCRIPTION OF THE DRAWINGS

Further details of the invention are described below with reference to the drawings. Identical or mutually corresponding drawing elements are provided in each case with the same reference characters in the figures and a repeat description thereof is provided only insofar as differences arise between the figures, in which.

DETAILED DESCRIPTION OF INVENTION

Figure 1:
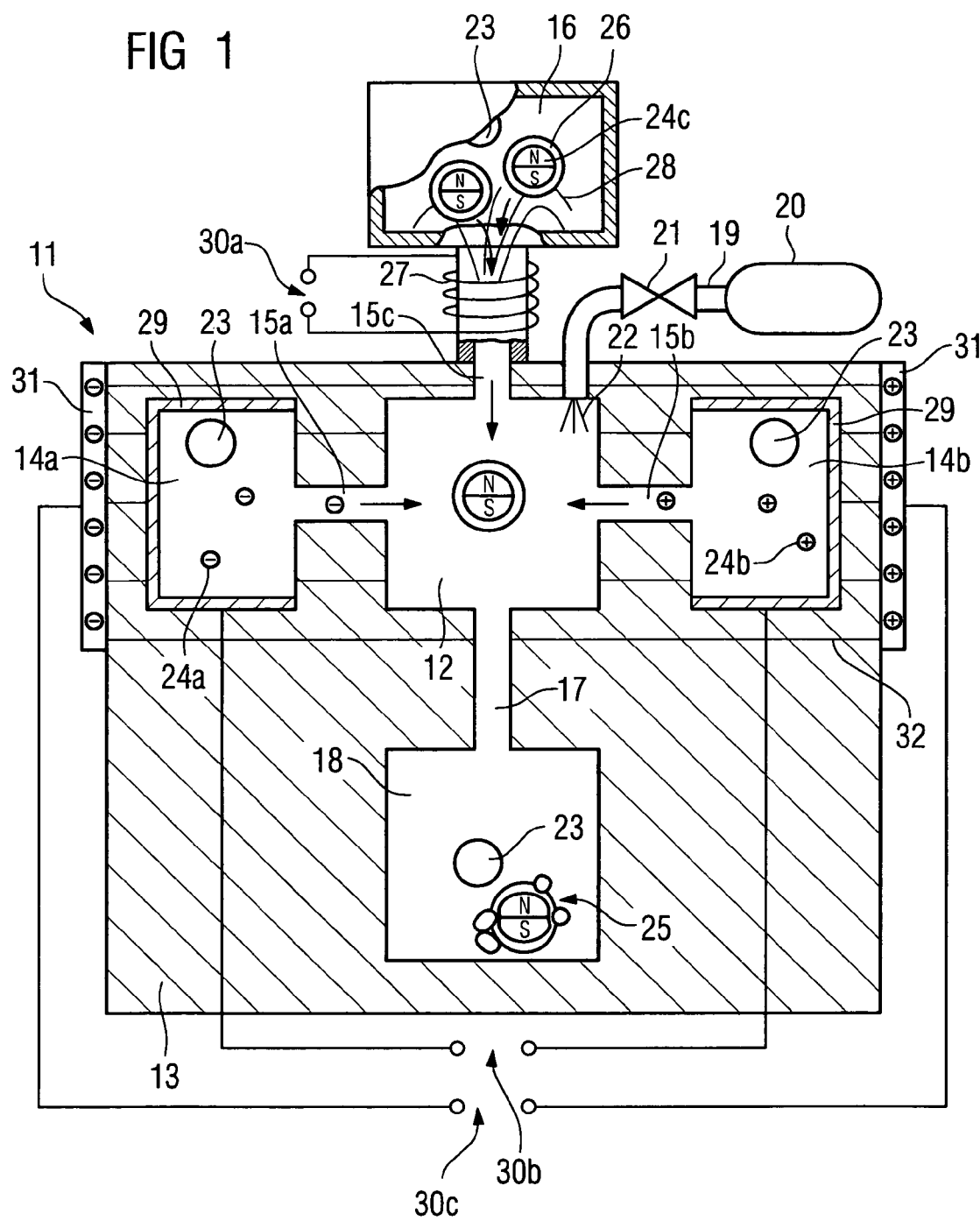
FIG. 1 shows the diagrammatic section through a microreaction chamber for carrying out an exemplary embodiment of the method according to the invention.

FIG. 1 shows a microreaction device 11 having as a central component a microreaction chamber 12. The microreaction chamber is manufactured by etching in a silicone substrate 13, which is shown in section. Further provided in the silicone substrate are storage chambers 14a, 14b, which are connected by feed channels 15a, 15b to the microreaction chamber 12. There is in addition an external storage chamber 16, which may be attached to a feed channel 15c in order to establish a connection to the microreaction chamber 12. Finally, by means of an outlet channel 17 a chamber 18 is provided for the reaction products produced in the microreaction chamber 12. The chambers 14a, 14b and 18 as well as the channels 15a, 15b, partially 15c and 17 are manufactured likewise by etching in the silicone substrate 13.

A container 20 for a fluid, i.e. a gas or a liquid or a mixture of both, is moreover connected by a feed line 19. Upon opening of a valve 21, in particular a fluid reaction component 22 may be fed from the container 20 into the microreaction chamber 12. While a fluid reaction component is involved in the reaction occurring in the microreaction chamber 12, it is also possible for example for an inert fluid (for example nitrogen or an inert gas) to be supplied in order to improve the transport and/or blending of the nanoparticle reaction partners. The transport of the reaction products through the outlet channel may moreover be assisted by the fluid.

The storage chambers 14a, 14b and 16 as well as the chamber 18 have openings 23, through which nanoparticles 24a, 24b, 24c involved in the reaction may be introduced into the storage chambers and a reaction product 25 may be removed from the chamber 18. The nanoparticles 24c are magnetized and moreover have on their surface a layer 26 that guarantees encapsulation of the nanoparticles 24c. The part of the feed channel 15c projecting from the silicone substrate 13 is surrounded by an electric coil 27, which with the aid of a voltage source 30a may generate in the feed channel 1c a magnetic field, which diminishes in the storage chamber 16 and the reaction chamber 12 with increasing distance from the feed channel 15c. By virtue of this field strength distribution of the magnetic field (field lines 28) the nanoparticles 24c in the storage chamber 16 are accelerated towards the entrance of the feed channel 15c and decelerated after emerging in the reaction chamber so that they are available here for the reaction.

The nanoparticles 24a in the storage chamber 14a are negatively charged and the nanoparticles 24b in the storage chamber 14b are positively charged. For this purpose, the walls of the reaction chambers 14a, 14b are lined with an electrode coating 29 and connected to a voltage source 30b. In this way, a positive and/or negative charging of the nanoparticles 24a, 24b is achieved. Capacitor panels 31 are moreover attached to the lateral faces of the silicone substrate 13 and charged by means of a voltage source 30c so as to produce an electric field (field lines 32). This is sufficiently strongly pronounced for field effects to be superposed by the charging of the electrode coatings 29. The electric field therefore assists the transporting of the electrically charged nanoparticles 14a, 14b into the reaction chamber 12, where they attach to the layer 26 of the nanoparticles 24c. This allows a charge exchange between the differently charged nanoparticles, a further effect of this charge exchange being that preferably differently charged nanoparticles attach adjacently to the layer 26. The nanoparticle reaction product 25 is then substantially electrically neutral.

The silicone substrate 13 may be provided from the direction of the represented plan view with a non-illustrated cover component so that the storage chambers 14a, 14b, the reaction chamber 12 and the chamber 18 are sealed. In this cover component a dissipation of heat may be effected in a likewise non-illustrated manner for example through cooling ducts integrated into the cover. A supply of energy is equally possible, for example the cover component may be of a transparent design and hence allow the injection of laser light into the reaction chamber 12.

Figure 2:
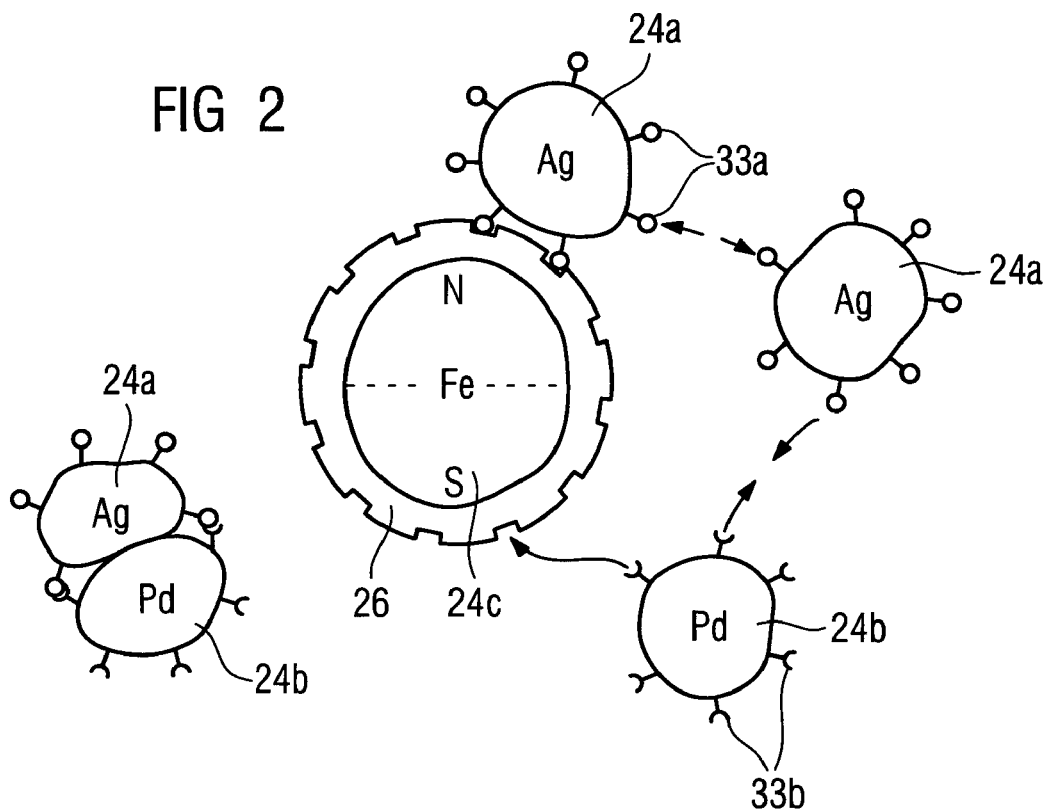
FIGS. 2 and 3 shows schematic representations of the reaction of nanoparticles according to an exemplary embodiment of the method according to the invention.
Figure 3:
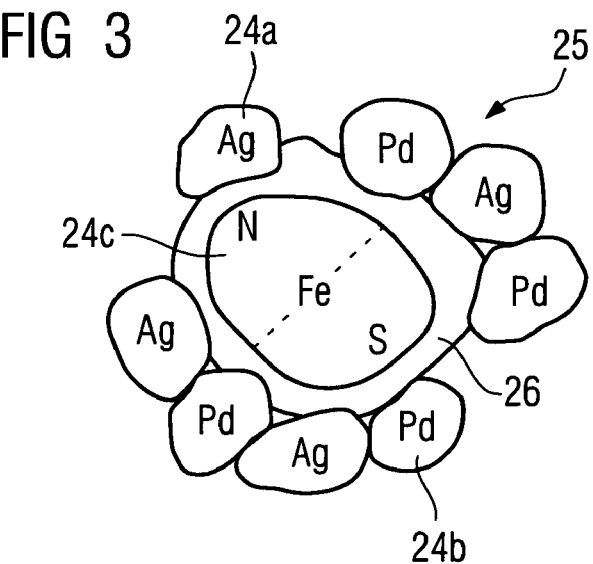

FIG. 2 shows by way of example a reaction of the type that may be carried out with the microreaction device 11. The magnetizable nanoparticle 24c comprises iron (Fe) and has a polymer layer 26 as encapsulation. This nanoparticle of iron forms the nucleus for an agglomerate of a limited number of nanoparticles in accordance with FIG. 3, which itself still has the dimensions of a nanoparticle. The nanoparticles 24a, 14b attached to the magnetic nanoparticle 24c are, as FIG. 2 reveals, functionalized at the surface with specific molecules 33a, 33b, thereby making a bond between nanoparticles 24a, 24b of an identical type at least markedly difficult. For this reason, preferably nanoparticles 24a, 24b of a different type attach to one another (lock-and-key principle). The nanoparticles 24a comprise silver (Ag) and the nanoparticles 24b palladium (Pd). The nanoparticles attached to one another in the described manner therefore produce electric local elements, which have an antimicrobial effect in an electrically conductive liquid.

The layer 26 enables a non-specific attachment of the molecules 33a, 33b, thereby allowing attachment of the agglomerates of nanoparticles 24a, 24b on the layer. The layer moreover guarantees that the nanoparticle 24c is electrically isolated, and for this reason in an electrically conductive liquid may form no local elements with the nanoparticles 24a, 24b. At the same time, the magnetizability of the nanoparticle 24c guarantees for example a transporting of the reaction product 25 in the electrochemically conductive liquid.

The invention claimed is:

1. A method of carrying out a reaction in a microreaction chamber, comprising:
   introducing a first composition of nanoparticles in a dosed manner through a first feed channel into the microreaction chamber;
   introducing further composition of nanoparticles in a dosed manner through a further feed channel into the microreaction chamber, wherein the nanoparticles of differing composition react with one another;
   producing a reaction product that is a result of the reaction of the differing composition nanoparticles; and
   removing the reaction product from the microreaction cell, wherein at least the nanoparticles of the first composition are functionalized at a surface before they are introduced into the reaction chamber.

2. The method as claimed in claim 1, wherein the functionalizing is formed by a layer arranged on the nanoparticles.

3. The method as claimed in claim 1, wherein energy is supplied to or removed from the microreaction chamber in a controlled manner during the reaction of the nanoparticles.

4. The method as claimed in claim 1, wherein the reaction product likewise comprises nanoparticles.

5. The method as claimed in claim 1, wherein the nanoparticles are magnetized prior to the dosing, and the dosing of the nanoparticles is assisted by a magnetic field superposed on the relevant feed channel.

6. The method as claimed in claim 1, wherein the nanoparticles are electrically charged prior to the dosing, and the dosing of the nanoparticles is assisted by an electric field that is superposed on the relevant feed channel.

7. The method as claimed in claim 1, wherein the nanoparticles are continuously fed and the reaction products are continuously removed.

8. The method as claimed in claim 1, wherein a fluid reaction component involved in the reaction of the nanoparticles is added to the microreaction chamber.

* * * * *